(12) United States Patent
Meitinger et al.

(10) Patent No.: US 8,313,110 B2
(45) Date of Patent: Nov. 20, 2012

(54) WHEEL SUSPENSION SYSTEM FOR MOTOR VEHICLES

(75) Inventors: Karl-Heinz Meitinger, Munich (DE); Peter Kunsch, Karlskorn (DE); Wilfried Michel, Riedenburg (DE); Hugo Mueller, Rohrenfels-Ballersdorf (DE); Wolfgang Schmid, Freising (DE); Christoph Kossira, Ingolstadt (DE)

(73) Assignee: Audi AG, Ingolstadt (DE)

( * ) Notice: Subject to any disclaimer, the term of this patent is extended or adjusted under 35 U.S.C. 154(b) by 142 days.

(21) Appl. No.: 12/739,768

(22) PCT Filed: Sep. 23, 2008

(86) PCT No.: PCT/EP2008/008040
§ 371 (c)(1),
(2), (4) Date: Aug. 9, 2010

(87) PCT Pub. No.: WO2009/052914
PCT Pub. Date: Apr. 30, 2009

(65) Prior Publication Data
US 2010/0327543 A1  Dec. 30, 2010

(30) Foreign Application Priority Data

Oct. 24, 2007 (DE) .......................... 10 2007 050 795
Feb. 27, 2008 (DE) .......................... 10 2008 011 367

(51) Int. Cl.
*B60G 3/26* (2006.01)

(52) U.S. Cl. .................................................. 280/5.521
(58) Field of Classification Search ............... 280/5.521, 280/5.52, 86.751, 86.757, 124.134, 124.135, 280/124.128, 124.15, 93.503, 93.504
See application file for complete search history.

(56) References Cited

U.S. PATENT DOCUMENTS
2002/0036385 A1   3/2002   Mackle et al.

FOREIGN PATENT DOCUMENTS
| DE | 39 28 135 A1 | 3/1990 |
| FR | 2 833 233 A | 6/2003 |
| WO | WO 98/16418 A | 4/1998 |
| WO | WO 2007/118629 A1 | 10/2007 |

*Primary Examiner* — Faye M. Fleming
(74) *Attorney, Agent, or Firm* — Novak Druce + Quigg LLP (57) ABSTRACT

The invention relates to a wheel suspension system for motor vehicles having a wheel carrier, which has a wheel-side support element, which mounts in a rotatable manner a vehicle wheel, and an axle-side support element, between which is connected an actuating member, on actuation of which the wheel-side support element can be pivoted through a pivot angle ($\phi$) relative to the axle-side support element for the purpose of adjusting a track and/or camber angle ($\delta$, $\epsilon$). According to the invention, the actuating member has a wheel-side rotational part and an axle-side rotational part, both of which can be rotated about their axes of rotation relative to each other, and the wheel-side rotational part can be deflected through the pivot angle ($\phi$) relative to the axle-side rotational part when the two rotational parts are rotated.

37 Claims, 7 Drawing Sheets

WHEEL SUSPENSION SYSTEM FOR MOTOR VEHICLES

The invention relates to a wheel suspension system for motor vehicles.

BACKGROUND OF THE INVENTION

In active steering systems, in particular for the rear axle of vehicles, the wheel camber and/or the wheel track can be adjusted by means of an actuating member, so that by controlling, the actuating member it is possible to influence in an active way the handling of the motor vehicle.

DE 39 28 135 A1 discloses a generic wheel suspension system for motor vehicles. The wheel earner of the wheel suspension system has a wheel-side support element, which mounts in a rotatable manner the vehicle wheel, and an axle-side support element, between which an actuating member is connected. In this case, the actuating member is a hydraulic actuating cylinder, which, on the one hand, is supported on a bearing bracket of the wheel carrier, and, on the other hand, presses against an outer race for a roller bearing of a wheel bearing with its piston rod. As a result, the wheel bearing executes, together with the vehicle wheel, a pivot motion around a central joint center point in order to change a toe-in and/or toe-out angle or a camber angle of the respective vehicle wheel.

The arrangement of the actuating member, which is disclosed in DE 39 28 135 A1 and is fitted between the bearing bracket and the wheel bearing, has a high space requirement and complicated constructive design with a correspondingly high weight. The overall high weight of the wheel suspension system is especially disadvantageous, because the wheel earner is an unsprung mass.

The object of the invention is to provide a wheel suspension system with an active steering system that is arranged in the wheel suspension system in such a way that it has a simple constructive design and optimizes the installation space.

SUMMARY OF THE INVENTION

According to the claimed invention, the actuating member has a wheel-side rotational part and an axle-side rotational part, both of which are arranged between the wheel-side support element and the axle-side support element and can be rotated about their axes of rotation relative to each other. At the same time, the wheel-side rotational part can be deflected through a pivot angle relative to the axle-side rotational part when the two rotational parts are rotated relative to each other. Therefore, the vehicle wheel that is provided on the wheel-side support element is pivoted correspondingly through a track angle and/or camber angle. Hence, in contrast to the prior art, the angle of the wheel-side support element is adjusted by a rotational actuation of one of the rotational parts and/or both rotational parts of the actuating member, and not by a linear stroke motion of a hydraulic actuating cylinder, which presses against the wheel-side bearing element. The angle can also be adjusted by means of a counter-clockwise or clockwise rotational actuation of both rotational parts and/or also through rotation of one of the two rotational parts, while the other rotational part does not rotate about its axis.

According to the invention, the wheel-side rotational part with its center axis can be moved about its axis of rotation in the manner of a wobble motion. For this purpose the axis of rotation of the wheel-side rotational part can be positioned at an oblique angle relative to the axis of rotation of the axle-side rotational part. During the wobble motion of the wheel-side rotational part, the two rotational parts can make contact, preferably sliding contact and/or rolling contact (roller bearing), by way of control surfaces that in turn lie in a plane of rotation. In this context, the plane of rotation is oriented perpendicularly to the axis of rotation of the wheel-side rotational part. In this way, the wheel-side rotational part can move with the associated wheel-side support element for the vehicle wheel in a wobble movement about its axis of rotation. At the same time, the pivot angle between the wheel-side rotational part and the axle-side rotational part changes as a function of the angle of rotation of the wheel-side rotational, part.

The two rotational parts of the actuating member can be pivot-mounted on the respective support elements, preferably, by means of pivot bearings. In this way, the two rotational parts can be rotated relative to each other, without transferring a torque to the support elements.

As an alternative, at least one of the rotational parts can be non-rotatably connected to the associated support element, i.e., for example, can be screwed or welded to the respective support element. Similarly, the at least one rotational part can be made of a uniform material with the associated support element.

In terms of installation space it is preferred that the two rotational parts be configured as hollow cylinders. Therefore, the cylindrical interior of the hollow cylinder can be used as the installation space for an actuator, articulated shafts and/or synchronous shafts. The actuator can also be provided, as a function of the available installation space, outside the rotational parts and be drive-connected to the rotational parts. As an alternative to the hollow cylindrical design, the rotational parts can also be made of a solid material and/or in any arbitrary shape.

Thus, the pivot, angle between the two rotational parts can be adjusted by rotating the wheel-side rotational part relative to the axle-side rotational part. In this case, for geometric reasons the maximally adjustable pivot angle is twice the angle of inclination enclosed between the two axes of rotation.

The spatial orientation of the angular configuration, formed by the two rotational parts, can be changed by rotating simultaneously or offset in time the axle-side rotational part relative to the axle-side support element.

A suitable actuator for the two rotational parts is, in particular, a rotary motor that can be arranged in a space-saving manner in a compact design inside the hollow cylindrical rotational parts. As an alternative, the actuator can also be arranged, as aforementioned, outside or in combination both outside and inside.

The actuators for the two rotational parts can be integrated into a control path or rather a control circuit with a control system that sets the angles of rotation of the two rotational parts on the basis of a desired track angle and/or desired camber angle that is to be set. For the closed control circuit the two rotational parts can be assigned angle sensors that detect an actual rotational angle value of the two rotational parts and feeds this value back to the control unit. The invention is applicable to all of the control strategies relating to the vehicle dynamics, driving comfort, the safety adjustments, or the basic design of the vehicle.

For a wheel suspension design that is compact in the transverse direction of the vehicle, the two rotational parts can be arranged so as to be internested in each other. Preferably, one of the two rotational parts, for example, the wheel-side rotational part, can be designed as a cup-shaped hollow profile member in which the axle-side rotational part is provided. In this case, the floor of the cup-shaped rotational part can be designed as an above-described control surface that makes contact with the control surface of the axle-side rotational part.

In addition, at least one of the support elements can also be designed as a cup-shaped hollow profile member with a peripheral wall that defines an assembly space, in which the actuating member of the invention is disposed. For a stable rotational mounting, the rotational parts can be supported on the peripheral wall of the cup-shaped support element. In the case of the above-described internested rotational part arrangement, only the radially outer rotational part can be supported on the peripheral wall of the cup-shaped support element.

According to an additional embodiment, an additional coupling element can be connected between the wheel-side support element and the axle-side support element. By means of this coupling element, a torque, for example, a braking torque, can be transferred from the wheel-side wheel element to the axle-side support element and, thus, to the vehicle body. This configuration of the invention is based on the premis that both the wheel-side rotational part and also the axle-side rotational part can be rotated relative to each other and with respect to the support elements. Therefore, in the worse case, for example, a braking torque, issuing from the wheel-side support element, cannot be transferred exactly to the axle-side support element and/or to the automotive, body owing to the degrees of rotational freedom between the rotational parts. The additional coupling element provides an additional force and/or torque path, by way of which the braking torque can be reliably transferred to the automotive body.

Preferably, the coupling element is totally uncoupled from the actuating member and/or the rotational parts of the wheel suspension system that are connected between the support elements. In this way, neither the coupling element nor the actuating member can be operationally influenced by the respective other component.

Preferably, the coupling element can be rotationally rigid and/or torsionally rigid in order to ensure the transmission of torque. Moreover, the coupling element can be designed so as to be adequately elastic and/or resilient in order to be able to compensate for a deflection of the wheel-side rotational part relative to the axle-side rotational part.

In a preferred embodiment, the coupling element is made as a metal bellows that is mounted on both the wheel-side and also the axle-side support element, for example, by way of fastening screws. In the assembly space, defined by the metal bellows, the rotational parts of the actuating member can be arranged so as to be protected against dirt. In this case, the rotational parts can be spaced apart from the metal, bellows over a free radial distance.

As aforementioned, the two rotational parts can be designed as hollow cylinders. Their cylindrical interior can, be used as the installation space for the actuators. As an alternative, an articulated shaft for driving the vehicle wheel can be run through the interior of the rotational parts.

The arrangement of the actuators inside the hollow cylindrical rotational parts is especially preferred when the vehicle wheel is trailing, that is, is not driven by an articulated shaft. In this case, the cavity of the rotational parts is empty, for which reason it is easy to provide the actuators therein.

In the event that an articulated shaft, which is guided through the cavity of the rotational parts, is used, then it may be necessary to arrange the actuators outside the two hollow cylindrical rotational parts due to the limited installation space. In this case, each of the rotational parts can have on the outer peripheral side a gear stage, for example, a spur gear stage or the like. The actuators, which are drive-connected to it, can be integrated into the free spaces, intended for this purpose, outside the wheel carrier, in a manner that optimizes the installation space.

However, such an arrangement of the gear stages as well as the associated actuators outside the rotational parts presents a problem with respect to the use of a metal bellows as a coupling element. The respective gear stage and/or the associated actuator would have to be run through the metal bellows, as a result of which the operational reliability of the metal bellows would be reduced. If such a feed-through of the gear is integrated into the metal bellows, the torque that can be transmitted by the metal bellows drops owing to the area moment of inertia at this point. In order to compensate, the diameter of the metal bellows would have to be greatly increased.

Therefore, as an alternative to the metal bellows, a universal joint, which is connected between the wheel-side and axle-side support element, can be used as a coupling element. For an embodiment that has less installation space, the universal joint can have an articulated part, for example, a ring element, that is disposed preferably radially outside the rotational parts and that extends at a radial distance around the rotational parts. Moreover, the universal joint can have legs that are connected to the support elements and that in the form of a joint yoke is hinged in an articulated manner in turn to the ring element by way of the axes of rotation. In this way, the torque is transmitted in a torsionally rigid manner and with zero play between the two support elements of the wheel carrier by means of the universal joint.

In contrast to the metal bellows, the universal joint can totally compensate for the deflection of the wheel-side rotational part by a defined pivot angle relative to the axle-side rotational part without any elastic reset forces and, thus, more easily overall than the metal bellows.

Preferably, the aforementioned wheel-side and axle-side legs are disposed at an angular offset relative to each other while simultaneously forming free spaces. At least to some extent, an actuator can be disposed in these free spaces in a manner that optimizes the installation space or as an alternative, there can be a gear stage arranged on the outside on the rotational part.

According to one embodiment of the invention, the middle of the universal joint is located at the level of the instantaneous center of rotation of the wheel carrier, as a result of which a change in length does not occur when the wheel carrier is adjusted.

Both the metal bellows and also the universal joint can absorb any braking torque that may occur. As a result, the actuator that is provided by means of the rotational parts cannot be stressed by the braking torques.

By choosing a suitable gear stage and/or spur gear stage, the actuators can also be set at an angle to the center axis of the actuating member. For the case in which the axle distances between the actuator and the rotational part are too great so that consequently the spur gear toothing would become too large, then, for example, a toothed belt drive can also be used.

DETAILED DESCRIPTION OF THE PREFERRED EMBODIMENTS OF THE INVENTION

Figure 1:
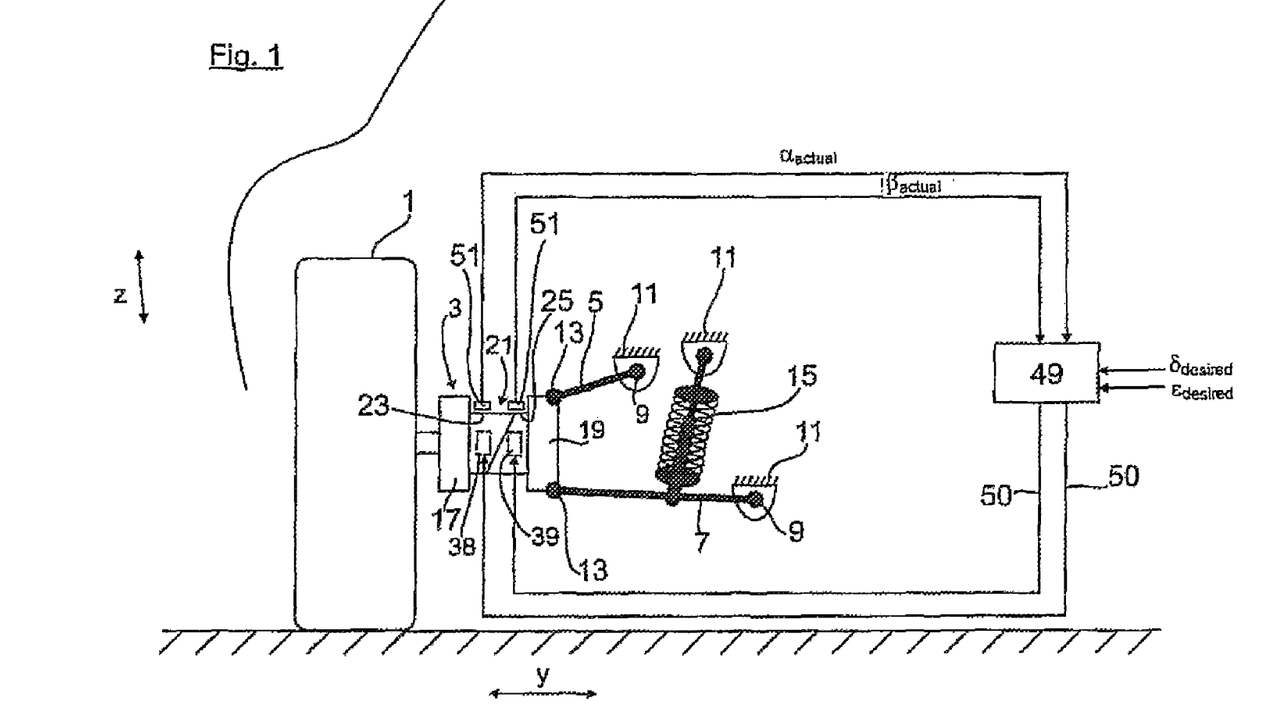
FIG. 1 is a schematic diagram of a wheel suspension system at a rear axle of a vehicle according to the first embodiment.

FIG. 1 shows the wheel suspension system in conjunction with a wishbone axle, which is known from the prior art and where a wheel carrier 3, which bears the vehicle wheel 1, is pivotally-coupled to the automotive body 11 by way of the body-side wishbone bearings 9, among other things, with the aid of an upper wishbone 5 and a lower wishbone 7. The body-side wishbone bearings 9 and the wheel carrier-side wishbone bearings 13 are designed in the conventional way. Moreover, a support spring 15 with an assigned strut is conventionally supported between the lower wishbone 7 and the vehicle body 11.

In contrast to the illustrated wishbone axle, the wheel carrier 3 can be combined with any axle, for example, a rigid axle, a twist beam rear axle, multi-link axle, etc.

According to FIG. 1, the wheel carrier 3 has a wheel-side support element 17 as well as an axle-side support element 19. On the wheel-side support element 17 the vehicle wheel 1 is supported by way of a wheel hub in a wheel bearing (not illustrated) of the wheel-side support element 17. Moreover, the brake system can be mounted in the customary manner on the wheel-side support element 17. The two wishbones 5, 7 are coupled to the axle-side support element 19 by way of wishbone bearings 13.

Figure 3:
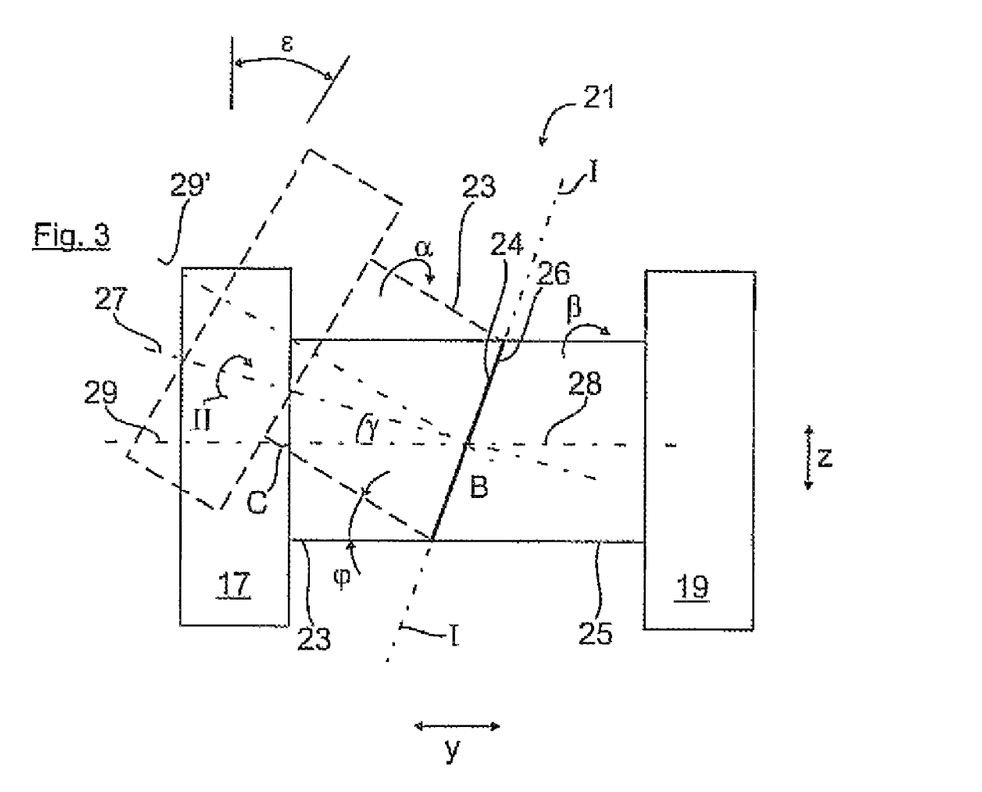
FIGS. 3 and 4 are views depicting the wheel carrier and the pivot motions of the two rotational parts for setting the track angle or camber angle.
Figure 4:
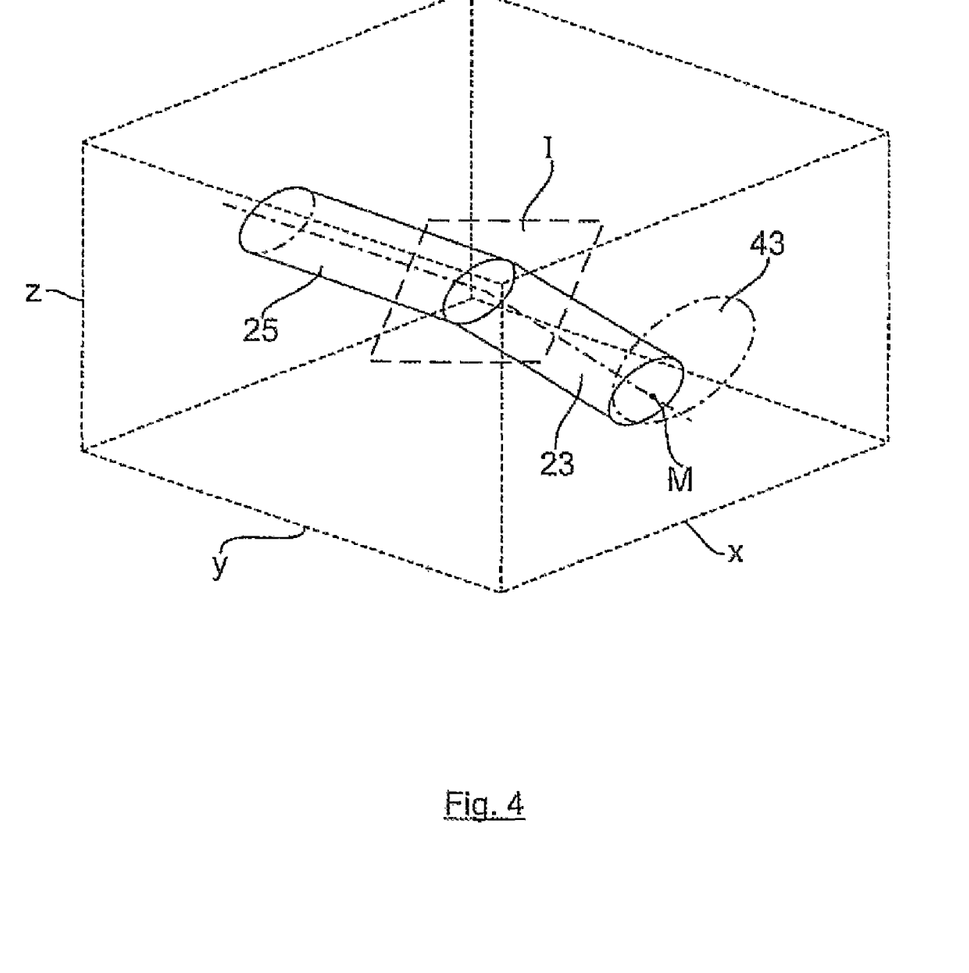

Between the two support elements 17, 19 there is an actuating member 21 that has a wheel-side rotational part 23 and an axle-side rotational part 25. It is evident from FIG. 2 or 3 that the two rotational parts 23 and 25 are in contact with each other by way of inclined control surfaces 24, 26. As a result, the two control surfaces 24, 26 lie in the plane of rotation I, which is indicated in FIGS. 3 and 4 and in which they can be moved in sliding contact on each other. Instead of the illustrated sliding contact, it is just as possible to have a mounting on roller bearings between the rotational parts.

The rotational parts 23, 25 are mounted between the two support elements 17, 19 respectively so as to be rotatable about their axes of rotation 27, 28. The axis of rotation 28 of the rotational part 25 is axially oriented in the transverse direction γ of the vehicle and coaxially oriented to the center axis 29 of the rotational part 23. The axis of rotation 27 of the rotational part 23 is inclined upwards at an angle of inclination γ. Therefore, on rotating through an angle of rotation α, the rotational part 23 moves with its center axis 29 about the axis of rotation 27 in a wobble motion II at a variable pivot angle cp. As an alternative, a skewed orientation of the two axes of rotation 27, 28 is also possible. The angle of rotation α describes a rotational angle offset between the rotational part 23 and the rotational part 25.

FIG. 3 shows the rotational part 23 in its starting position at an angle of rotation α=0, at which the center axis 29 of the rotational part 23 is oriented coaxially to the axis of rotation 28 of the rotational part 25. In this case, the camber angle ε is 0 in the illustrated yz plane of the vehicle wheel 1.

Moreover, in FIG. 3 the dashed lines show, as an example, the rotational part 23 in a rotational position at an angle of rotation α=180°. In this rotational position, the rotational part 23 with its center axis 29 is moved upwards in the wobble motion II about the axis of rotation 27. The result of this feature is a pivot angle φ between the two rotational parts 23 and 25. At the illustrated angle of rotation α of 180°, the pivot angle φ has its maximum value. Analogously, the vehicle wheel 1 or rather the wheel-side support element 17 is also pivoted through the camber angle ε in the yz plane.

Simultaneously with the rotation of the rotational part 23 or offset in time thereto, the rotational part 25 can be rotated through an angle of rotation β relative to the axle-side support element 19.

In this way, the rotational part 23, which is shown in FIG. 3 and which is angled relative to the axle-side rotational part 25, is pivoted out of the yz plane, as a result of which the track angle δ of the vehicle wheel 1 is adjustable. Hence, in the case of an exemplary rotation of the angled rotational part 23 through an angle of rotation β of 90° in the xy plane, the track angle δ would correspond to the pivot angle φ, and the camber angle ε would be reduced to 0.

Thus, a combined camber and track adjustment can be effected by a combined rotation of the rotational parts 23, 25 through the angles of rotation α, β. At the same time any combination of track angle δ and camber angle ε is conceivable as long as a maximum pivot angle $\phi_{max}=2\gamma$ is, not exceeded, and the following equation $$\sin^2\delta + \sin^2\varepsilon \leq \sin^2\phi_{max}$$

is observed.

In the figures the angle of inclination γ that is enclosed between the two axes of rotation 27 and 28 is greatly exaggerated for ease of comprehension. In fact, the angle of inclination fluctuates on the order of 2° to 5°. Depending on the respective application the angle of inclination can also be outside this angular range. Depending on the application, angles of inclination on the order of 45° are also conceivable.

In any combinations of track angle δ and camber angle ε, the center point M, which is shown in FIGS. 3 and 4 on the free front side of the wheel-side rotational part 23, moves in a spherical surface cutout 43, which is defined by a clashed-dotted circular line in the coordinate system of FIG. 4.

Figure 2:
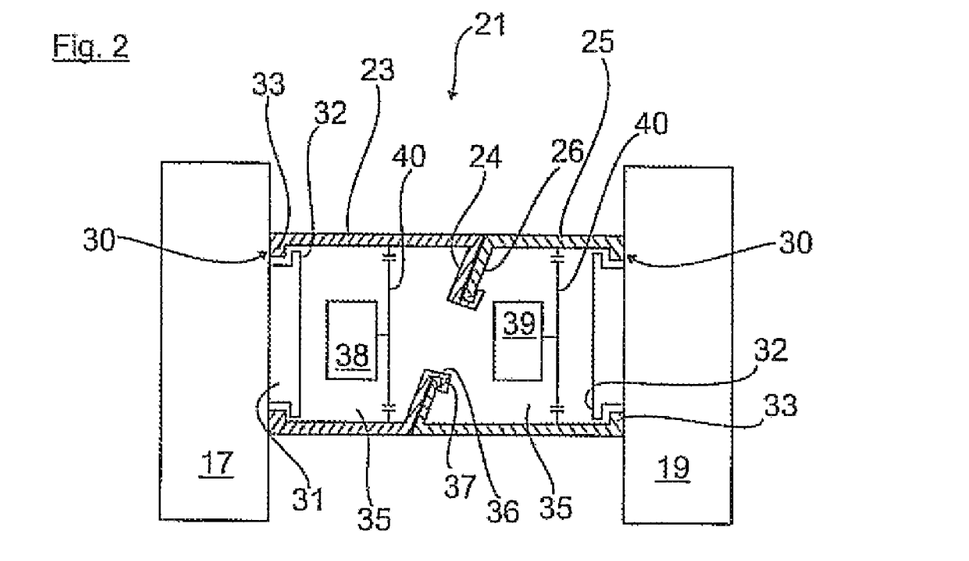
FIG. 2 is an enlarged schematic drawing of a sectional view of a part of the wheel carrier in isolation.

FIG. 2 is a basic schematic drawing, the purpose of which is merely to show an example of the mounting and the actuator of the two rotational parts 23, 25 between the support elements 17, 19 of the wheel carrier 3. Therefore, the rotational parts 23, 25 are connected to the support elements 17, 19 by way of pivot bearings 30. Each of the pivot bearings 30 has an axle projection 31, which projects from the support element 17, 19 and which projects into the rotational part 23, 25, which is designed to be a hollow cylinder. In this context, each axle projection 31 extends behind a front-side annular collar 33 of the respective rotational part 23, 25 with a flange 32 that is widened in the radial direction. At the same time, the two rotational parts 23, 25 are arranged in a rotational manner with their annular collar 33 between the flange 32 and the respective support element 17, 19. The control surfaces 25, 26, which are in contact with each other, have assembly openings that are arranged opposite each other. They connect together the two cylindrical interiors 35 of the rotational parts 23, 25.

As stated above, the two control surfaces 24, 26 are in sliding contact relative to each other and can be moved on each other when the two rotational parts are rotated. In order to couple the two rotational parts 23, 25, the control surface 24 of the wheel-side rotational part 23 is designed, according to FIG. 2, with a peripheral flange 36, which is hook-shaped in the cross section. The flange 36 projects through the assembly opening of the opposing control surface 26 of the axle-side rotational part 25, and with one leg 37 the control surface 26 extends behind the rotational part 25.

The cavities 35 of the two rotational parts 23, 25 have rotary motors 38, 39, which mesh with an internal toothing of the respective rotational part 23, 25 by way of a gear train 40.

In order to actively adjust the track and camber, as shown in FIG. 1, a higher order control unit (not illustrated) calculates, on the basis of different vehicle parameters, the desired values $\delta_{desired}$ and $\epsilon_{desired}$ for the track and camber angles and sends these values to a control system 49. The control system 49 can be actuated by way of signal lines 50 with the rotary motors 38, 39 of the two rotational parts 23, 25 that rotate the respective rotational parts 23, 25 through an angle of rotation $\alpha$ or an angle of rotation $\beta$. As indicated in FIG. 1, the two rotational parts 23, 25 are assigned angle sensors 51, which detect an actual value $\beta_{actual}$ and $\beta_{actual}$ of the two rotational parts 23, 25 and feed them back to the control system 49.

The following calculation is based on the angle of rotation $\alpha$ as the rotational angle offset between the rotational part 23 and the rotational part 25 as well as the angle of rotation $\beta$ as the rotational angle offset between the axle-side support element 19 and the rotational part 25.

The angles of rotation $\alpha$ and $\beta$ for the rotary motors 38, 39 of the two rotational parts 23, 25 are calculated by means of a motion algorithm in the control system 49. The starting point for the motion algorithm is the movement of the front-side center point M (shown in FIG. 4) of the rotational part 23. The coordinates x, y, z of the center point M in the coordinate system are calculated according to the following formulas (forward calculation):

$$x = -r \cdot \cos\theta \cdot [\cos\beta \cdot \sin\theta \cdot (1-\cos\alpha) + \sin\alpha \cdot \sin\beta] \quad (1)$$

$$y = r \cdot (\sin^2\theta + \cos^2\theta \cdot \cos\alpha) \quad (2)$$

$$z = r \cdot \cos\theta \cdot [\sin\beta \cdot \sin\theta \cdot (1-\cos\alpha) - \sin\alpha \cdot \cos\beta] \quad (3)$$

where $\theta = 90° - \gamma$

For a desired combination of track and camber angle $\delta$ and $\epsilon$ the angles of rotation $\alpha$ and $\beta$ are calculated, for example, with the following formulas (backward calculation):

$$\alpha = \pm \arccos[(y - r \cdot \sin^2\vartheta)/(r \cdot \cos^2\vartheta)]$$

$$\beta = \pm \arccos \frac{[-\cos\vartheta \cdot \sin\vartheta \cdot (1-\cos\alpha)] \cdot x + (-\cos\vartheta \cdot \sin\alpha \cdot z)]}{\sqrt{x^2 + z^2} \cdot \sqrt{[-\cos\vartheta \cdot \sin\vartheta \cdot (1-\cos\alpha)]^2 + (-\cos\vartheta \cdot \sin\alpha)^2}}$$

where $x = -r \cdot \cos(\varepsilon) \cdot \sin(\delta)$ $y = r \cdot \cos(\varepsilon) \cdot \cos(\delta)$ $z = r \cdot \sin(\varepsilon)$ and $r$ = the distance between the points $B$ and $C$ of FIG. 3.

Of the four possible combinations for a solution for $\alpha$ and $\beta$, two combinations are applicable in each case. Exceptions are $\alpha = 180°$, where four combinations are applicable and $\alpha = 0°$, which yields identical x, y, and z for all angles of rotation $\beta$ (infinite number of solutions). The validity of a combination can be checked, for example, by using the aforementioned formulas for the forward calculation to calculate the x, y, and z coordinates and then comparing with the given x, y, and z of the backward calculation.

In the event that there is a change in the back or camber, the applicable combinations of solutions are calculated, and then that solution is used, for example, for which the angular variations for $\alpha$ and $\beta$ are as small as possible in comparison to the current angle of the actual position.

In contrast to the illustrated rotary motors 38, 39, the rotational parts 23 and 25 can be rotated by any actuator that produces a rotational motion. In this case, the starting position of the two cylinders relative to each other can be arbitrarily selected and is only dependent on the current pre-set track and camber value.

Figure 5:
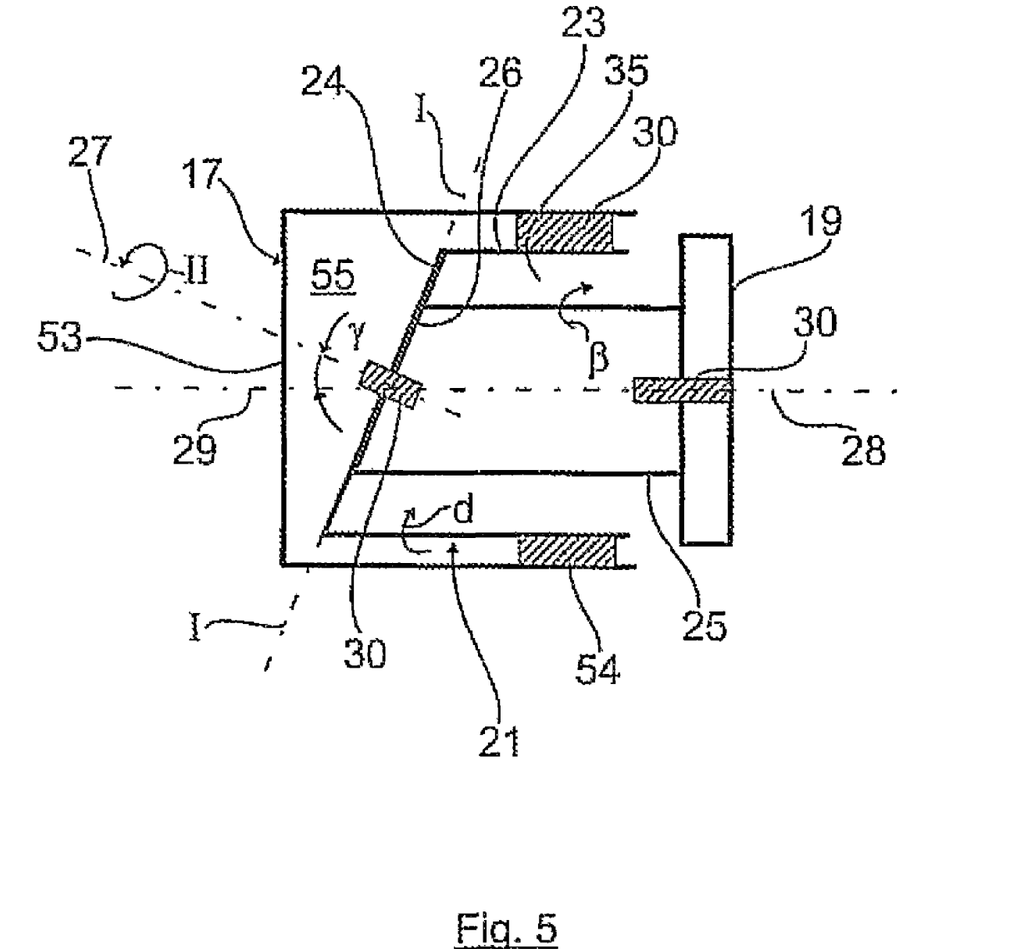
FIG. 5 shows the wheel carrier according to the second embodiment in isolation.

FIG. 5 is a schematic drawing depicting the wheel carrier 3 according to the second embodiment. The operating principle is equivalent to that of the wheel carrier 3 from FIGS. 1 to 4, so that reference is made to its description. The identical reference numerals are used for those components that are the same.

In contrast to the first embodiment, the two rotational parts 23, 25 are not arranged axially in succession, but rather the two rotational parts 23, 25 are arranged internested in each other in a manner that optimizes the installation space. In this case, the axle-side rotational part 25 is fitted in the cylindrical cavity 35 of the wheel-side rotational part 23.

As in the first embodiment, FIG. 5 shows that the two rotational parts 23, 25 are in contact with each other by way of their inclined control surfaces 24, 26 that in turn lie in the plane of rotation I. There, the wheel-side support element 17 is not made as a plate, but rather is made in the shape of a cup with a wheel-side support element bottom 53 and a peripheral wall 54, which is, for example, cylindrical in this embodiment.

The actuating member 21, which consists of the two rotational parts 23, 25, is arranged almost completely within the assembly space 55 that is defined by the cup-shaped support element 17. At the same time, the rotational part 23 is rotatably supported on the peripheral wall 54 of the support element 17 by way of the pivot bearing 30. Only the axle-side end of the rotational part 25, which is pivoted on the axle-side support element 19, projects out of the assembly space 55 of the cup-shaped support element 17.

In a manner analogous to the first embodiment the rotational part 23 with it center axis 29 can rotate about the axis of rotation 27 in the wobble motion II at a variable pivot angle $\phi$. Moreover, the rotational part 25 can rotate relative to the axle-side support element 19 through the angle of rotation $\beta$.

The first two embodiments from FIGS. 1 to 5 are based on the basic operating principle and the control algorithm, on the basis of which the wheel-side and axle-side rotational parts 23, 25 can be rotated relative to each other between the wheel-side support element 17 and the axle-side support element 19.

Moreover, it is also evident from FIGS. 1 to 5 of the first two embodiments that the two support elements 17 and 19 are not mounted in a rotationally rigid mariner relative to each other, but rather in certain operating and driving states the degree of rotational freedom, to be described once again below, between the two support elements 17, 19 is important. Thus, as shown in FIG. 2, on the one hand, the rotary motor 38 can rotate relative to both the rotational part 25 and also the wheel-side support element 19 by way of the gear train 40 of the rotational part 23. On the other hand, the rotary motor 39 can rotate the rotational part 25 relative to both the rotational part 23 and also relative to the axle-side support element 19 by way of the gear train 40. In this context, the rotary motor 38 can be securely connected to the wheel-side support element 17 while the rotary motor 39 can be securely connected to the axle-side support element 19. Even if the rotary motors 38, 39 are blocked, the two rotational parts 23, 25 are not connected in a rotationally rigid manner by way of their control surfaces 24, 26.

In the worse case, the arrangement, shown in FIGS. 1 to 5, runs the risk that the moments from the wheel-side support element 17 are not transmitted to the axle-side support element 19 because a torque transmission is not possible even if the rotary motors 38, 39 are blocked by way of the control surfaces 24, 26 of the rotational parts 23, 25 by the degree of rotational freedom that is present in between. Such torques that are to be transmitted are, for example, braking torques or reaction moments from the wheel vertical force with a lever arm, which results to a certain extent from the inclined effective surfaces.

Figure 6:
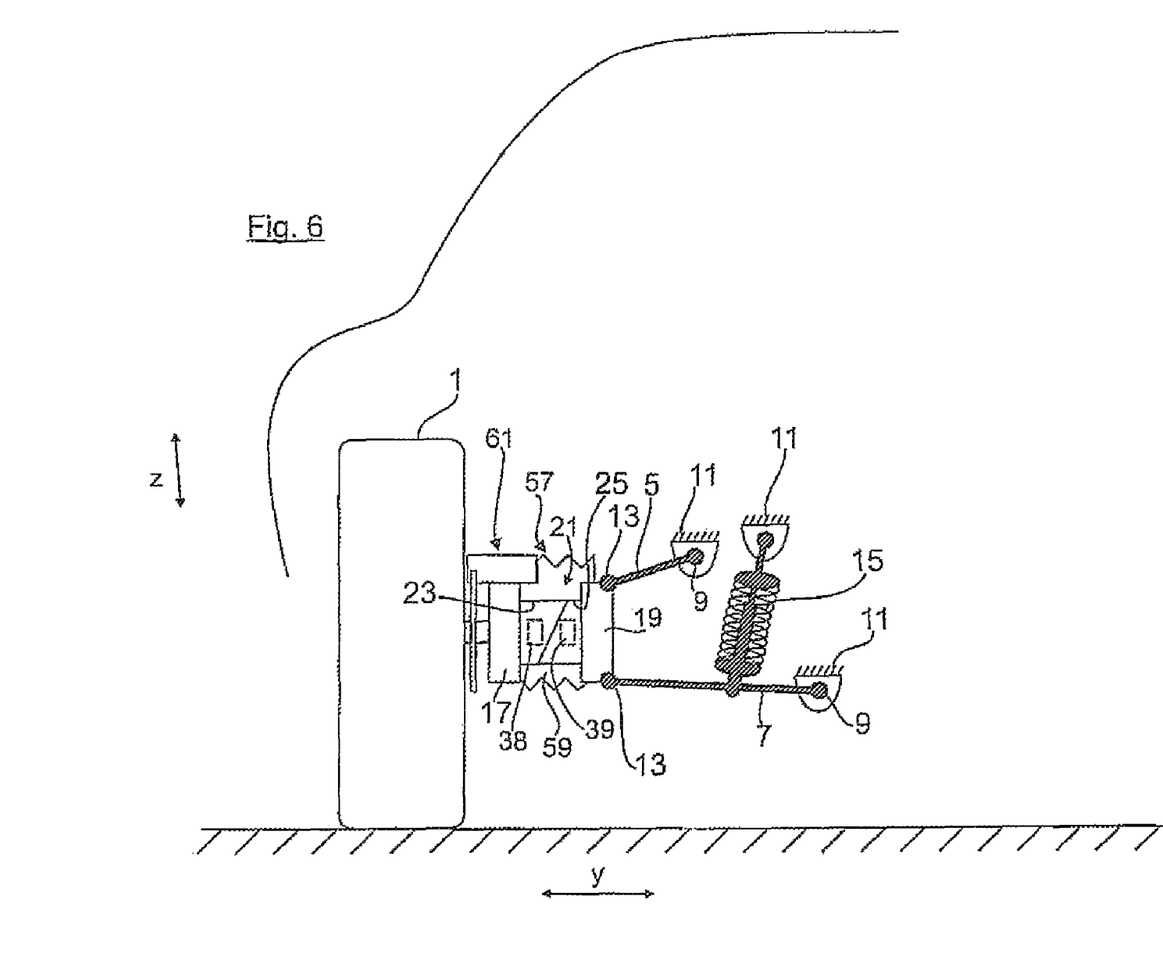
FIG. 6 shows the wheel carrier according to the third embodiment with an integrated metal bellows.
Figure 7:
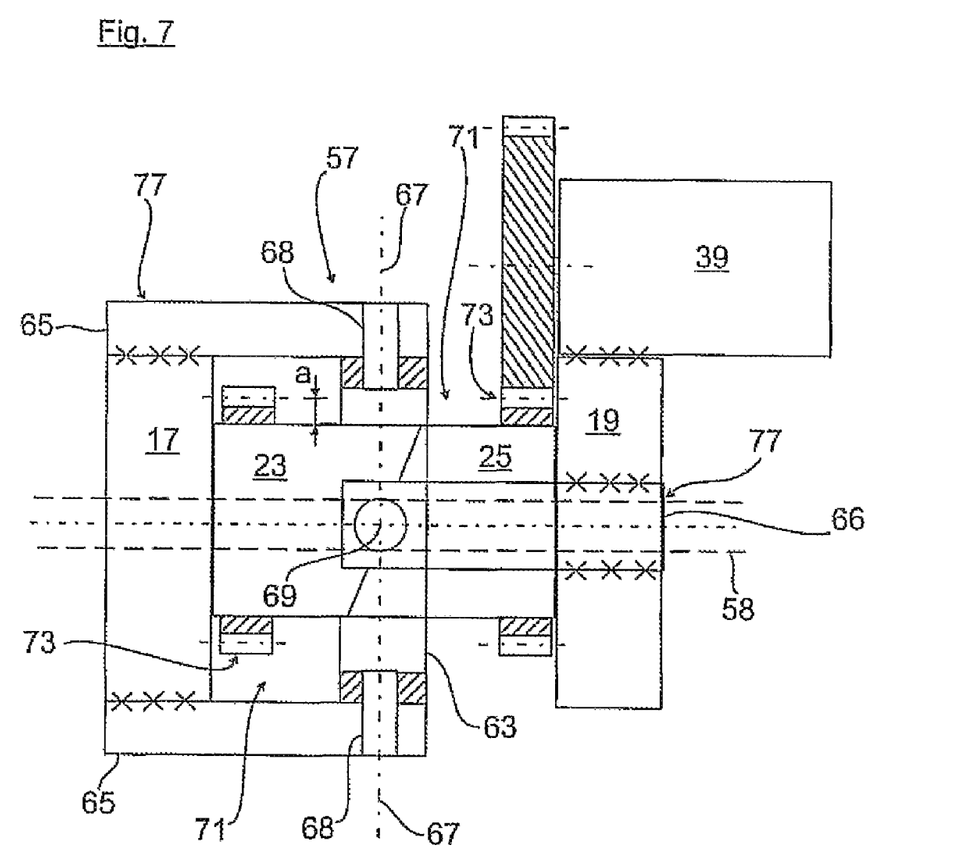
FIG. 7 shows the wheel carrier according to the fourth embodiment with an integrated universal joint.

Therefore, the following third and fourth embodiments of FIGS. 6 and 7 show that for a torque transmission from the wheel-side support element 17 to the axle-side support element 19 there are the respective coupling elements 57 that are connected in between and are designed to be flexurally soft and torsionally rigid in their axial direction.

The third embodiment, shown in FIG. 6, is essentially identical to the first embodiment in terms of operation and construction. Consequently, reference is made to its description. In contrast to the preceding embodiments, a metal bellows is used as the coupling element 57 in the embodiment of FIG. 6. Metal bellows exhibit, as is well-known from the prior art, a high rotational rigidity, so that an exact transmission of the angular moments or torques is ensured, and in particular independently of the transmission path that runs by way of the rotational parts 23, 25.

The ends of the metal bellows 57, shown in FIG. 6, are securely mounted on the wheel-side support element 17 and on the axle-side support element 19 with fastening screws (not illustrated). Owing to its cylindrical jacket, which is shaped like an accordion, the metal bellows 57 is elastically resilient in its axial direction so that angular displacements of the two rotational parts 23, 25 can be compensated by the pivot angle φ at low reset forces.

The metal bellows 57 is spaced apart from the rotational parts 23, 25 over a free radial distance and defines, according to FIG. 6, an assembly space 59, in which the two rotational parts 23, are disposed, optionally hermetically sealed to the outside.

During a braking operation, the brake system 61, which is mounted on the wheel-side support element 17 and which is indicated in FIG. 6, is activated. The braking torque, which is generated as a result, is not passed by way of the two rotational parts 23, 25 to the vehicle body, but rather by way of the metal bellows 5'7, which enables a zero-play and torsionally rigid torque transmission of the braking torque to the vehicle body.

FIG. 7 shows the fourth embodiment, of which the fundamental design matches that of the preceding embodiments. Hence, reference is made to their description. In contrast to the preceding embodiments, the vehicle wheel 1 (not illustrated in FIG. 7), which is held on the wheel-side support element 17, does not trail, that is, is not driven by an articulated shaft, but rather there is additionally an articulated shaft 58, which is shown by the dashed line in FIG. 7.

The articulated shaft 58 runs through the cavities 35 of the two rotational parts 23, 25 and drives the vehicle wheel 1, as is the case for a rear-wheel-drive or all-wheel-drive. Therefore, for space-related reasons, the two actuators 38, 39 (m FIG. 7 only the actuator 39 is shown) are no longer disposed inside the cavities 35, but rather outside the cavity 35 of the two rotational parts 23, 25. FIG. 7 shows that the two actuators 38, 39 are in a toothed connection by way of spur gear stages 73 that are provided on the outer peripheral side on the rotational parts 23, 25.

In contrast to the third embodiment of FIG. 6, the coupling element 57 for the transmission of a braking torque from the wheel-side support element 17 to the axle-side support element 19 is not a metal bellows, but rather a universal joint. According to FIG. 7, the universal joint 57 has, as a central articulated part, a gimbal ring 63, which is shown as a half section and which extends radially outside around the rotational parts 23, 25 and which is spaced apart from the rotational parts 23, 25 over a radial distance a. The gimbal ring 63 is connected to the wheel-side support element 17 and the axle-side support element 19 by way of a universal joint yoke 77 in each case.

Each of the two joint yokes 77 has wheel-side and axle-side legs 65, 66. The legs 65, 66 are hinged, on the one hand, in a fixed connection to the support elements 17, 19 and, on the other hand, are hinged to the gimbal ring 63 by means of the bearing journals 68, which define the axes of rotation 67, 69, which are at a right angle to each other. According to FIG. 7, the wheel-side and axle-side legs 65, 66 are angularly offset relative to each other by an angle of 90°, and in particular while forming free spaces 71. Preferably the gear stage 73 and/or the respective rotary motor 38, 39 can project at least partially into these free spaces 71.

Figure 8:
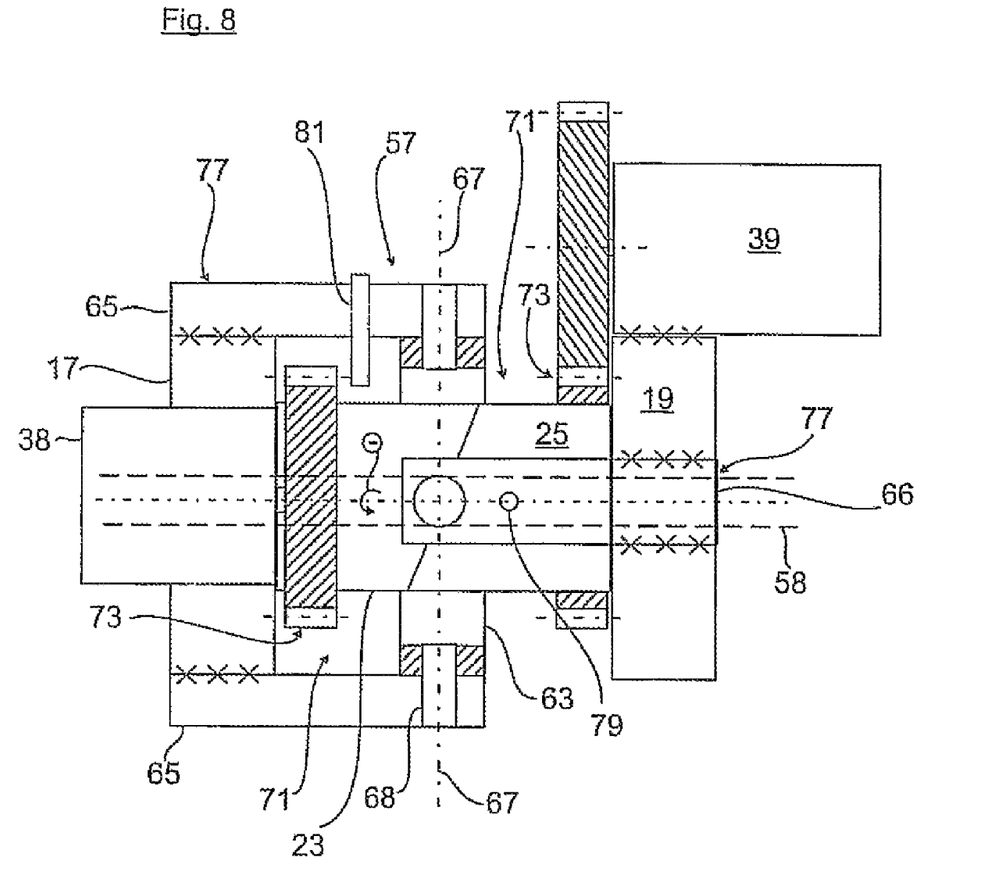
FIG. 8 shows the wheel carrier according to the fifth embodiment.

The design of the embodiment, shown in FIG. 8, is in essence identical to that of the arrangement shown in FIG. 7. As in FIG. 7, the actuators 38, 39, in particular the electric motors, are also disposed outside the cavities 35 of the two rotational parts in FIG. 8. FIG. 8 shows additionally the actuator 38, which meshes analogously to the actuator 39 with the outer toothed rim of the rotational part 23 by means of a spur gear stage 73.

It is also evident from FIG. 8 that the wheel-side and axle-side legs 65, 66 of the joint yokes 77 have rotational angle sensors 79, 81. The rotational angle sensor 79 detects the angle of rotation β, which describes, according to the specification, the rotational angle offset between the rotational part 25 and the axle-side support element 19.

The rotational angle sensor 81 detects an angle of rotation Θ that is shown in FIG. 8. This angle describes the rotation of the rotational part 23 relative to the support element 17. The angle of rotation Θ of the rotational part 23 is adjusted by means of the actuator 38.

In contrast to the preceding embodiments, FIG. 5 shows that instead of using the angles of rotation α and β to control the track and/or camber adjustment, use is made of the angles of rotation β and Θ that are detected by the rotational angle sensors 79, 81.

The angle Θ can be derived from the angles of rotation α, β that are relevant for the control operation by means of elementary geometric relations. In principle, when the two support elements 17 and 19 are coupled together in a flexurally soft and rotationally rigid manner, the system is determined by two of the three angles α, β, Θ, from which any arbitrary setting and measurement combination of angles can be derived in order to achieve an unambiguous positioning of the actuating member 21.

As an alternative to the above embodiment, it is possible to dispense with the coupling element 57 between the two support elements 17, 19, and the wheel-side support element 17 can be connected in a rotationally rigid manner to the rotational part 23, or the wheel bearing can be integrated, directly into the rotational part 23 while simultaneously dispensing with the support element 17. In this case, the angles of rotation α and β are necessary for an unambiguous positioning of the actuating member 21.

The invention claimed is:

1. A wheel suspension system for motor vehicles having a wheel carrier, which has a wheel-side support element, which mounts in a rotatable manner a vehicle wheel, and an axle-side support element, between which is connected an actuating member, on actuation of which the wheel-side support element can be pivoted through a pivot angle (φ) relative to the axle-side support element for the purpose of adjusting a track and/or camber angle (δ, ε), wherein the actuating member has a wheel-side rotational part and an axle-side rotational part, both of which can be rotated about their axes of rotation) relative to each other, and that the wheel-side rotational part can be deflected through the pivot angle (φ) relative to the axle-side rotational part when the two rotational parts are rotated, wherein the axis of rotation of the wheel-side rotational part is tilted at an angle of inclination (γ) relative to the axis of rotation of the axle-side rotational part, and the two rotational parts are mounted in a rotatable manner on the respective support elements by means of pivot bearings and/or roller bearings and wherein the rotational part can be rotated with its center axis in a wobble motion at a variable pivot angle (φ) about the axes of rotation.

2. The wheel suspension system according to claim 1 wherein the two rotational parts are in contact, in one of sliding contact and rolling contact, by way of control surfaces, which lie in a plane of rotation (I), which is perpendicular to the axis of rotation of the wheel-side rotational part.

3. The wheel suspension system according to claim 1 wherein by rotating the wheel-side rotational part, the pivot angle (φ) is set, and by rotating the axle-side rotational part relative to the axle-side support element, the spatial orientation of the angular arrangement consisting of the two rotational parts can be fixed.

4. The wheel suspension system according to claim 1 wherein the two rotational parts are designed with cavities.

5. The wheel suspension system according to claim 4 wherein each of the two rotational parts is assigned an actuator, in particular a rotary motor, which is disposed one of inside and outside the respective rotational part.

6. The wheel suspension system according to claim 5 wherein the actuators of the rotational parts are assigned a control unit, which determines, on the basis of a desired track and/or desired camber angle ($\epsilon_{desired}$, $\delta_{desired}$), the angles of rotation (α, β), by means of which the rotational parts are to be adjusted by means of the actuators.

7. The wheel suspension system according to claim 5 wherein the rotational parts are assigned angle sensors, which detect an actual rotational angle value ($\alpha_{actual}$, $\beta_{actual}$) of the rotational parts and feed this value back to the control unit.

8. The wheel suspension system according to claim 1 wherein, the two rotational parts are arranged so as to be internested in each other in the axial direction, where in particular, the axle-side rotational part is arranged in a cavity of the wheel-side rotational part.

9. The wheel suspension system according to claim 1 wherein at least one of the two support elements defines, as a hollow profile member, an assembly space, in which the two rotational parts are disposed at least partially.

10. The wheel suspension system according claim 9 wherein a coupling element, which is provided preferably outside the rotational parts, is connected between the wheel-side support element and the axle-side support element.

11. The wheel suspension system according to claim 10 wherein with the coupling element, a torque, including a braking torque, can be transferred to the axle-side support element from the wheel-side support element.

12. The wheel suspension system according to claim 10 wherein the coupling element is at least one of operationally uncoupled from the actuating member and rotational parts, and/or is spaced apart from the actuating member over a clear distance (a).

13. The wheel suspension system according to claim 10 the coupling element at least one of rotationally rigid and torsionally rigid, and allows the wheel-side rotational part to deflect through the pivot angle (φ) relative to the axle-side rotational part.

14. The wheel suspension system according to claim 10 wherein the coupling element is a metal bellows, which is mounted preferably on the wheel-side and on the axle-side support elements.

15. The wheel suspension system according to claim 14 wherein the rotational parts are disposed in an assembly space defined by the metal bellows.

16. The wheel suspension system according to one of the claims 10 to 14, characterized in that the coupling element is a universal joint.

17. The wheel suspension system according to claim 16 wherein the universal joint has a base element, for example, a ring element, which is arranged preferably radially outside the rotational parts, and wheel-side and axle-side legs, which are connected to the support elements and which are hinged in an articulated manner to the base element by way of axes of rotation.

18. The wheel suspension system according to claim 17 wherein the wheel-side legs and the axle-side legs are offset at an, angle to each other while at the same time forming free spaces.

19. The wheel suspension system according to claim 18 there is at least one rotational angle sensor arrangement that detects at least one of an angle of rotation (α) between the wheel-side rotational part and the axle-side rotational part, an angle of rotation (β) between the axle-side rotational part and the axle-side support element, and/or an angle of rotation (Θ) between the wheel-side rotational part and the wheel-side support element and sends this value to the control unit.

20. The wheel suspension system according to claim 19 wherein the rotational angle sensor arrangement detects at least two of the angles of rotation (α, β, Θ), and that the control unit derives any arbitrary setting and measurement combination of the angles of rotation (α, β, Θ) from the two detected angles of rotation (α, β, Θ), in order to achieve an unambiguous positioning of the actuating member.

21. The wheel suspension system according to claim 19 wherein on dispensing with the coupling element and in particular, on integrating a wheel bearing into the wheel-side rotational part, the rotational angle sensor arrangement detects the angles of rotation (α, β) for unambiguously positioning the actuating member.

22. The wheel suspension system according to claim 5 wherein each of the rotational parts on the outer peripheral side is provided with a gear stage, which leads to the respectively assigned actuator, in particular, by way of the free spaces.

23. The wheel suspension system according to claim 16 wherein the center of the universal joint is at the level of the instantaneous center of rotation of the wheel carrier.

24. The wheel suspension system according to claim 5 wherein the actuators are mounted on the respective support element.

25. The wheel suspension system according to claim 4 wherein an articulated shaft for driving a vehicle wheel runs through the cavities of the rotational parts.

26. A method for determining angles of rotation (α, β) of the rotational parts of a wheel suspension system according to claim 1 wherein the angles of rotation (α, β) are calculated on the basis of a necessary track and camber angle (δ, ε) by means of a motion algorithm.

27. The method according to claim 26 wherein from the angles of rotation ($\alpha$, $\beta$) of the rotational parts the coordinates (x, y, z) of the front-side center point (M) of the rotational part are calculated first with the following equations (forward calculation):

$$x = -r \cdot \cos\theta [\cos\beta \cdot \sin\theta \cdot (1-\cos\alpha) + \sin\alpha \cdot \sin\beta] \quad (1)$$

$$y = r \cdot (\sin^2\theta + \cos^2\theta \cdot \cos\alpha) \quad (2)$$

$$z = r \cdot \cos\theta \cdot [\sin\beta \cdot \sin\theta \cdot (1-\cos\alpha) - \sin\alpha \cdot \cos\beta] \quad (3)$$

where $\theta = 90° - \gamma$.

28. The method according to claim 27 wherein from the equations the angles of rotation ($\alpha$, $\beta$) are determined, as follows, by means of the backward calculation:

$$\alpha = \pm \arccos[(y - r \cdot \sin^2\vartheta)/(r \cdot \cos^2\vartheta)]$$

$$\beta = \pm \arccos \frac{[-\cos\vartheta \cdot \sin\vartheta \cdot (1-\cos\alpha)] \cdot x + (-\cos\vartheta \cdot \sin\alpha \cdot z)]}{\sqrt{x^2 + z^2} \cdot \sqrt{[-\cos\vartheta \cdot \sin\vartheta \cdot (1-\cos\alpha)]^2 + (-\cos\vartheta \cdot \sin\alpha)^2}}$$

where $x = -r \cdot \cos(\varepsilon) \cdot \sin(\delta)$ $y = r \cdot \cos(\varepsilon) \cdot \cos(\delta)$ $z = r \cdot \sin(\varepsilon)$ and $r$ = distance between the front-side points $B$ and $C$, which lie on the center axis 29 of the rotational part.

29. The method according to claim 28 wherein to check the four possible combinations for a solution for the angles of rotation ($\alpha$, $\beta$) in the forward calculation, the x, y, and z coordinates are calculated and compared with the x, y, and z coordinates of the backward calculation, and from that the two valid combinations for a solution for the angles of rotation ($\alpha$, $\beta$) are determined.

30. The method according to claim 29 wherein the angles of rotation ($\alpha$, $\beta$) for the two valid combinations for a solution for the angles of rotation ($\alpha$, $\beta$) are compared with the currently set values, and the combination is selected at which the difference between the current value and the solution is less.

31. A wheel suspension system for a motor vehicle, comprising:
a first mounting member connectable to a body of said vehicle;
a first connecting member rotationally supported on said first mounting member for rotation about a first axis, having an end surface in a plane disposed at an acute angle relative said first axis;
a second mounting member connectable to a wheel unit of said vehicles;
a second connecting member rotationally supported on said second mounting member for rotation about a second axis disposable in axial alignment with said first axis, having an end surface rotatably connected to an end surface of said first connecting surface lying in a plane disposed at an acute, angle relative to said first axis, rotatable about a third axis intersecting said first and second axes; and
at least one means for rotating at least one of said first and second connecting means about the axis thereof to alter the camber of said wheel unit.

32. A system according to claim 31 wherein said rotating means is disposed on at least one of the inner and outer sides of at least one of said connecting members.

33. A system according to claim 31 including means interconnecting said mounting members for transmitting torque therebetween.

34. A system according to claim 33 wherein said torque transmitting means comprises a bellows.

35. A system according to claim 33 wherein said torque transmitting means comprises a universal connection.

36. A system according to claim 31 including:
means for sensing the angular disposition of each of said connecting members relative to the axes thereof;
means responsive to signals corresponding to said sensed angular disposition for determining a selected corrective signal, for achieving a selected angular disposition of said third axis; and
means for generating at least one signal to at least one of said rotating means to provide said selected angular disposition of said third axis.

37. A system according to claim 31 including torque transmitting means extending through said connecting means, drivingly interconnectable to drive means of said vehicle and said wheel units.

* * * * *

UNITED STATES PATENT AND TRADEMARK OFFICE
CERTIFICATE OF CORRECTION

PATENT NO.        : 8,313,110 B2
APPLICATION NO.   : 12/739768
DATED             : November 20, 2012
INVENTOR(S)       : Meitinger et al.

It is certified that error appears in the above-identified patent and that said Letters Patent is hereby corrected as shown below:

Claim 7: Column 11, line 42: "...according to claim 5̶ 6..." The number 5 should be replaced with the number 6.

Claim 18: Column 12, line 26: "...are offset at an̶,̶ angle..." The "," is unnecessary and should be considered deleted.

Claim 27: Column 13, lines 1-11: The equation uses an incorrect symbol. All "θ" should be replaced by "ϑ" in the claim.

Claim 31: Column 14, line 3: "...about a first axis, h̶a̶y̶i̶n̶g̶ having an end..." Please correct the spelling of "having".

Claim 31: Column 14, line 12: "... disposed at an acute̶,̶ angle..." The "," is unnecessary and should be considered deleted.

Signed and Sealed this
Twenty-sixth Day of February, 2013

Teresa Stanek Rea
*Acting Director of the United States Patent and Trademark Office*